United States Patent [19]
Baer

[11] 3,747,248

[45] July 24, 1973

[54] FISHING APPARATUS
[76] Inventor: Jacob F. Baer, 5810 Texas Ave., Houston, Tex. 77011
[22] Filed: Apr. 14, 1971
[21] Appl. No.: 133,780

[52] U.S. Cl. .............................................. 43/43.13
[51] Int. Cl. ............................................ A01k 93/00
[58] Field of Search ................ 43/43.13, 26.1, 26.2, 43/4; 46/93

[56] References Cited
UNITED STATES PATENTS

| | | | |
|---|---|---|---|
| 1,859,557 | 5/1932 | Edgar | 46/93 |
| 270,358 | 1/1883 | Aldrich | 43/43.13 |
| 1,361,602 | 12/1920 | Marks | 43/43.13 |

Primary Examiner—Warner H. Camp
Attorney—Bill B. Berryhill

[57] ABSTRACT

Fishing apparatus comprising a floating body on which a sail is mounted in a plane substantially perpendicular and transverse of the longitudinal centerline of the floating body. One end of a line is attached to a control device on the floating body and the other end of the line is held at a point removed from the floating body. The control device may be operable to alternately transfer the point, at which the force of wind blowing on the sail is transmitted to the line, from one side of the floating body centerline to the other. In one embodiment the control device may comprise a hand actuated reel device. In another embodiment the control device is automatically operated by a wind vane on the floating body.

14 Claims, 10 Drawing Figures

PATENTED JUL 24 1973 3,747,248

Jacob F. Baer
INVENTOR

BY
Bill B Berryhill
ATTORNEY

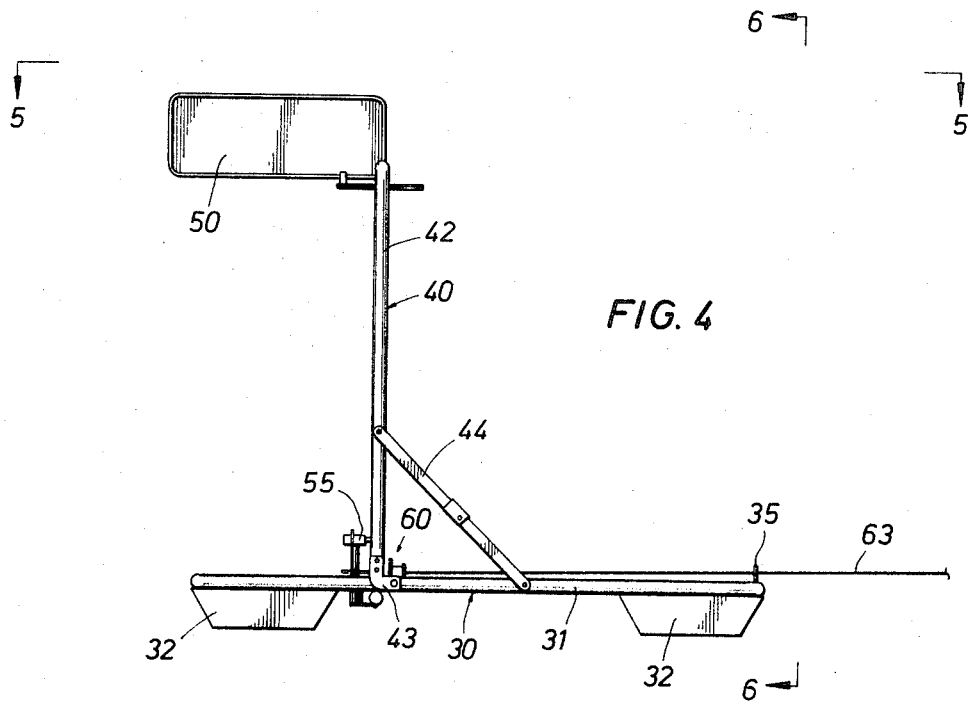
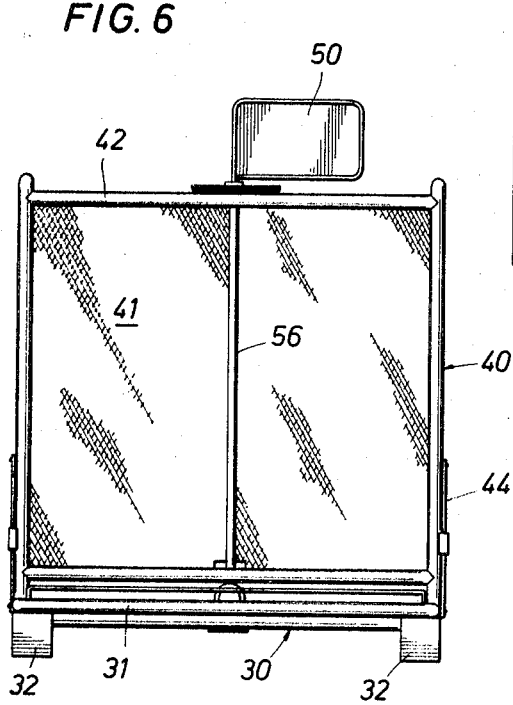

Jacob F. Baer
INVENTOR

BY
Bill B. Berryhill
ATTORNEY

FISHING APPARATUS

BACKGROUND OF THE INVENTION

1. Field of the Invention

The present invention pertains to apparatus for fishing. In particular it pertains to a recent development in fishing referred to as sail line fishing.

2. Description of the Prior Art

Probably for so long as man has tested his skill against the elusive fish, he has ever been devising methods for increasing his catch. Fisherman have long sought to increase their coverage of a particular fishing area through various devices. The ordinary rod and reel is simply a method of increasing the coverage or distance at which the fisherman's hook may be presented to the fish. More recently, some ingenious devices have been developed for propelling a hook through the water at increased distances. For example, see U.S. Pat. Nos. 2,951,307; 3,099,099; and 3,149,435.

Even more recently a method of fishing, generally referred to as sail line fishing, has come into use. In such apparatus a simple sheet sail is mounted on a raft to which a fishing line is attached. The sail pulls the line away from its launching point and keeps the line taut while presenting baited hooks to a fish. The hooks are attached to the main line by short dropper lines similar to the well-known trot line. This method allows the fisherman to use a larger number of hooks and fish a greater area than would be possible otherwise. This type of fishing is of course largely dependent on the direction of the wind. Although it permits fishing at a great distance, the line is generally held in a stationary position, largely beyond the control of the fisherman.

SUMMARY OF THE PRESENT INVENTION

The present invention provides apparatus which renders sail line fishing capable of much broader coverage and more accurate control. Apparatus is provided whereby a guideline, which may be the fishing line, may be manipulated so as to change the tack of the sail, causing the raft to which it is attached to move in an arc at the end of the line.

BRIEF DESCRIPTION OF THE DRAWINGS

For a better understanding of the invention, a description will follow, referring to the accompanying drawings in which:

FIG. 4 is a side-elevation view of another preferred embodiment of the invention;

FIG. 5 is a top plan view of the embodiment of FIG. 4 taken along line 5—5 thereof;

FIG. 6 is an end-elevation view of the embodiment shown in FIGS. 4 and 5 taken along line 6—6 of FIG. 4;

DESCRIPTION OF PREFERRED EMBODIMENTS

Figures 1, 2, 3:
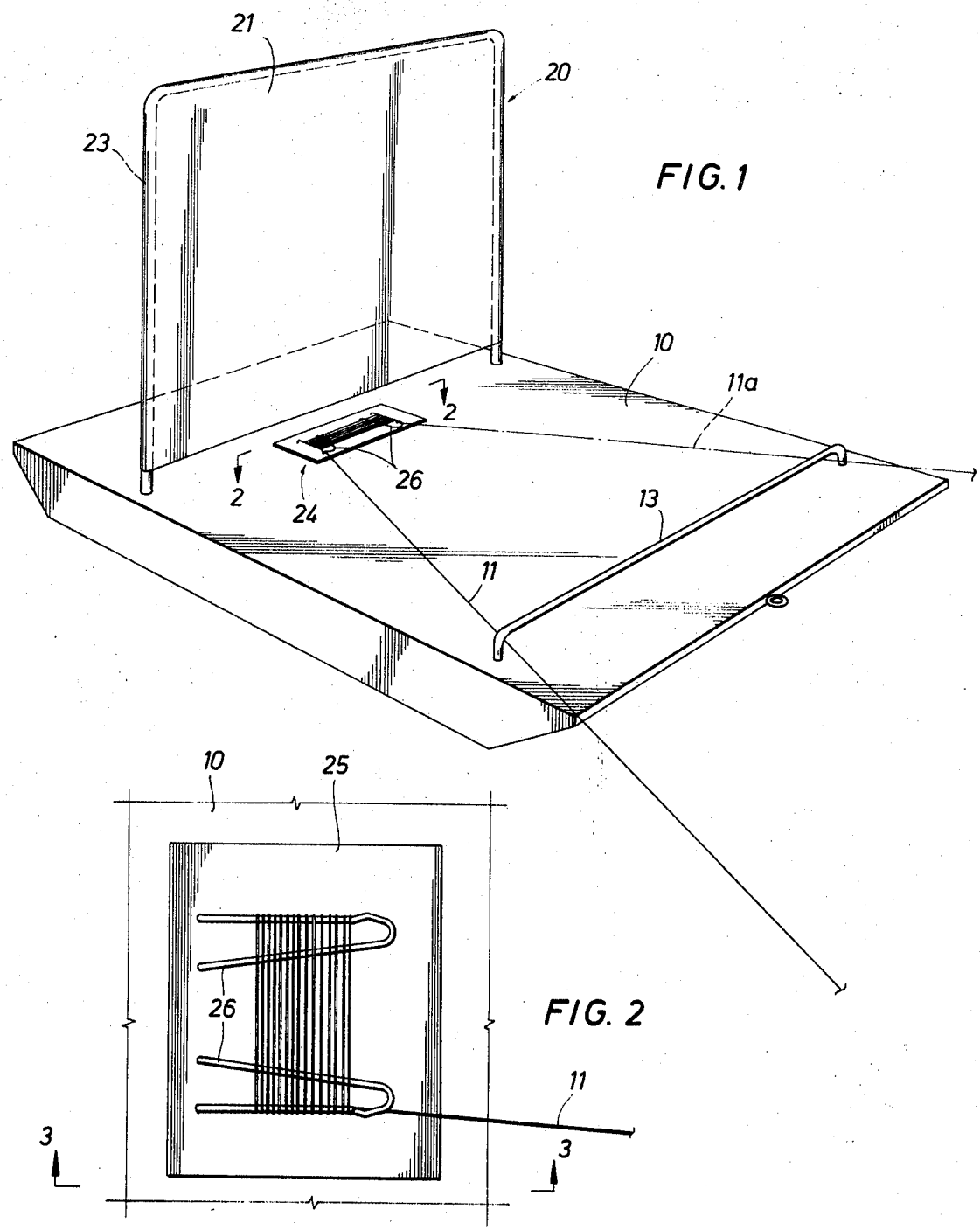
FIG. 1 is a perspective view of a simplified embodiment of the invention.
FIG. 2 is a detailed plan view of control apparatus of the embodiment of FIG. 1.
FIG. 3 is a detailed elevation view of the control apparatus of FIG. 2 taken along line 3—3 thereof.

Referring first to FIGS. 1, 2 and 3, there is shown a simplified version of the invention which comprises a floating body or raft 10 on which a sail 20 is mounted. The raft 10 can be made in any suitable shape or with any suitable material. Plastic foam is particularly suitable for this use. The sail 20 is of the simple flat sheet type and is mounted in a plane perpendicular to the raft 10 and at right angles to the longitudinal centerline of raft 10. Sail 20 may be simply constructed by sliding a plastic sandwich bag 21 over a wire frame 23 which is stuck into the raft 10 and possibly glued thereto. Mounted near the base of sail 20 is a fixed reel device 24 which may comprise a flat metal plate 25 and a pair of spring clips 26, one on each side of the raft centerline. Spring clips 26 are fastened toward the rear of raft 10 and are biased at their forward ends into contact with metal plate 25. Looped around spring clips 26 a number of times is the guideline 11 which passes through a line guide 13 at the forward end of the raft 10 to the fisherman located at the launching point. A fishing line (not shown) may be attached to either the forward or rearward end of raft 10. Hooks could also be attached to guideline 11.

The purpose of fixed reel 24 is to provide a means whereby the tack of sail 20 may be periodically changed so that raft 10 can be made to move in an arc at the end of guideline 11. The force of wind blowing against sail 20 is transmitted to guideline 11 at its point of contact with one of the spring clips 26. Since these clips are offset from the centerline of raft 10, the sail 20 will be caused to rotate to an angular position relative to the wind. If it were not for guide 13 the sail 20 would rotate until its plane would be parallel to the wind direction, preventing movement in any direction other than with the wind. However, since the guideline 11 comes to stop against the guide 13 the sail 20 is held in a particular tack position causing the raft to sail in an arc at the end of line 11. When the raft reaches the limit point desired, a slight jerk on line 11 will cause one loop of the line to be disengaged from one of the spring clips so that the force will then be applied to the other spring clip on the opposite side of the raft centerline. The sail then rotates in a counter direction until line 11 engages the opposite side of guide 13 as represented by the dotted line 11a. In this tack position the raft 10 begins to sail in an arc at the end of line 11 in the opposite direction. Line 11 may be jerked at opposite ends of the arc so as to cycle the raft back and forth. Line 11 may be attached at launching point to a conventional rod and reel for easy winding and control.

Referring now to FIGS. 4 through 10, a more complex version of the invention will be described. Although its basic principle of operation is similar to the simplified version, the second embodiment has the advantage of being completely automatic, requiring no human manipulation of the lines for changing the sail tack and reversing direction of the raft.

In general this embodiment comprises a raft 30 and flat sheet sail 40 mounted perpendicular thereto. The raft 30 may comprise a light tubular frame 31 mounted on pontoon members 32 at its corners. These pontoon members may be made of plastic foam or any other suitable buoyant material. The flat sheet sail 40 may comprise a rectangular piece of sail material 41 attached to a frame member 42. The frame 42 may be attached to raft frame 31 by a pivot member 43 and folding link 44, permitting the sail 40 to be folded forward so as to lie flat on raft 30. This permits the entire apparatus to be easily carried and stored in a minimum of space.

Attached to the raft 30 directly below sail 40 is a mechanism 60 for changing the tack position of sail 40 relative to line 63, to which fishing hooks (not shown) may be attached. The mechanism 60 serves the same function as the fixed reel 24 of the embodiment shown in FIG. 1. However, mechanism 60 is completely automatic and does not require manipulation by the fisherman. For the time being, it is sufficient to say that mechanism 60 transmits the wind force on sail 40 to the line 63 at one of two points on opposite sides of the centerline of the raft 30. The line 63 passes through a guide member 35 similar to the guide 13 in FIG. 1. When the mechanism 60 and the line 63 are positioned as shown in FIG. 5, the tack of the sail 40 causes the raft 30 to sail in a counterclockwise direction arc about the end of line 63. When the mechanism 60 is actuated, as to be explained hereafter, at the end of this arc, the force is applied to the end of line 63 on the opposite side of the raft centerline and the line 63 moves to the opposite side of guide 35 causing the sail to tack in the opposite direction and the raft to sail in a clockwise arc about the end of line 63. Thus, the line 63 moves back and forth in the water, presenting baited hooks throughout these large arc sweeps. The mechanism 60 is actuated at the end of these arcs by an arm member 55 at the base of a rotating shaft 56 whose axis generally coincides with the vertical centerline of sail 40. The shaft 56 is caused to rotate, as will be more fully understood hereafter, by a wind vane 50 which is mounted on a staff or rod 51 for rotation relative to shaft 56.

Referring now to FIGS. 7 through 10, a detailed description of tack changing mechanism 60 will be given. The mechanism is provided with a bracket 66 by which it may be attached to the cross-member 39 of raft 30 by any suitable means such as screw 61. The bracket 66 supports, at the forward end, a fixed reel member 62 whose axis is parallel to the longitudinal centerline of the raft on which it is mounted and perpendicular to the plane of the sail member. Supported at the rearward end of bracket 66 on a secondary bracket 64 is an escapement mechanism which comprises escapement arms 67 and 68, mounted for pivoting motion about points 71' and 72, respectively. A guide yoke 77 attached to bracket 64 and pin members 75 and 76 limits the inward and outward pivoting motion of escapement arms 67 and 68. A spring member 78 biases the arms 67, 68 toward engagement with limit pins 75, 76 respectively. Mounted for rotation about an axis coincidental with the axis of fixed reel 62 is a crank member 70. Crank member 70 comprises a shaft at the rear end of which is an arm 71 and pin portion 69 parallel to the shaft. The forward end of the shaft supports another arm portion 65 at the end of which is an eye member 74 through which the line 63 passes from a wound position on reel 62. When a force is applied to line 63, as it would be when the wind is blowing against the sail of the apparatus, there is a tendency to rotate crank 70 in a clockwise direction as viewed in FIG. 9. This causes the pin 69 to engage one of the stop notches 67a or 68a of escapement arms 67, 68 respectively. As long as nothing is done to cause escapement arms 67 and 68 to pivot away from the center, the crank 70, including arms 71 and 65, remain stationary. However, if the escapement arm, which the pin 69 is engaging (67 in this case), is caused to pivot away from the center, pin 69 will disengage the stop notch 67a allowing the crank 70 to rotate 180° until pin 69 engages stop notch 68a. This 180° rotation of the crank member 70 causes arm 65 and eye member 74 to also rotate 180°, unwinding line 63 one-half turn off of reel 62 and placing the point at which the wind force is applied to line 63 on the opposite side of the raft centerline. The sail will then tack in the opposite direction. To rewind the line 63 on reel 62, crank member 70 may be rotated in a clockwise direction as viewed in FIG. 7 by holding to pin 69.

Figure 7:
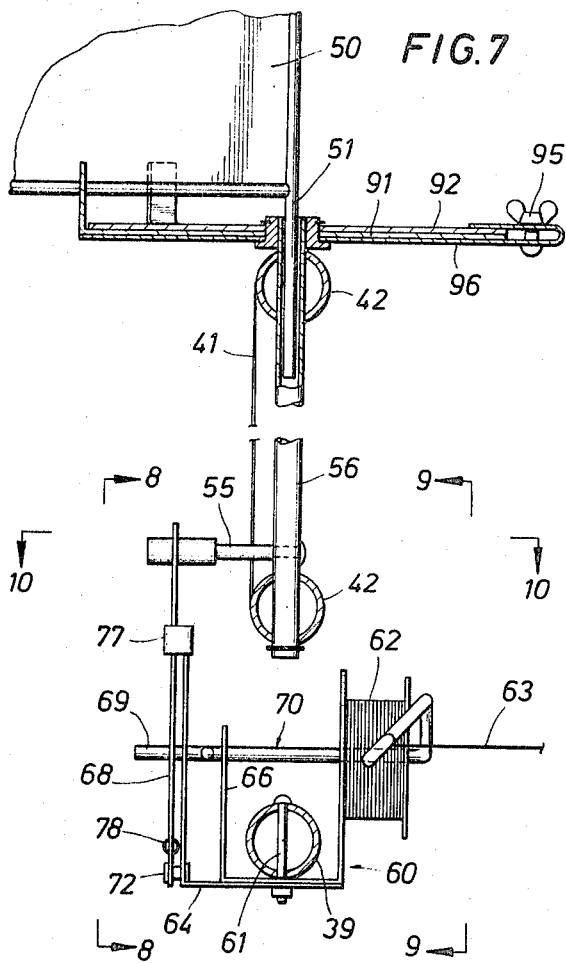
FIG. 7 is a detailed side-elevation view of a mechanism of the embodiment of FIGS. 4 through 6 which permits automatic changing of its sail tack.
Figure 8:
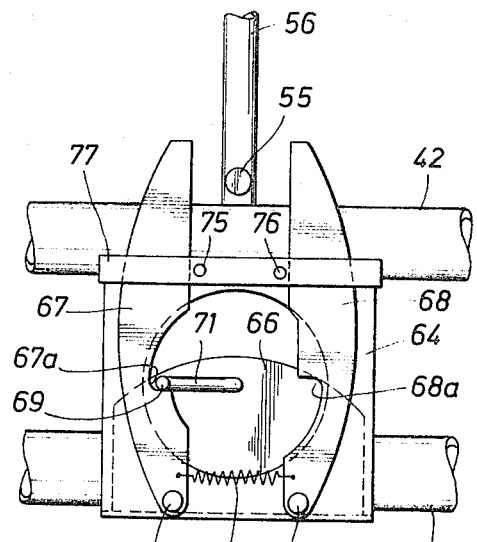
FIG. 8 is a rear-end elevation of the mechanism of FIG. 7 taken along line 8—8 thereof.
Figure 10:
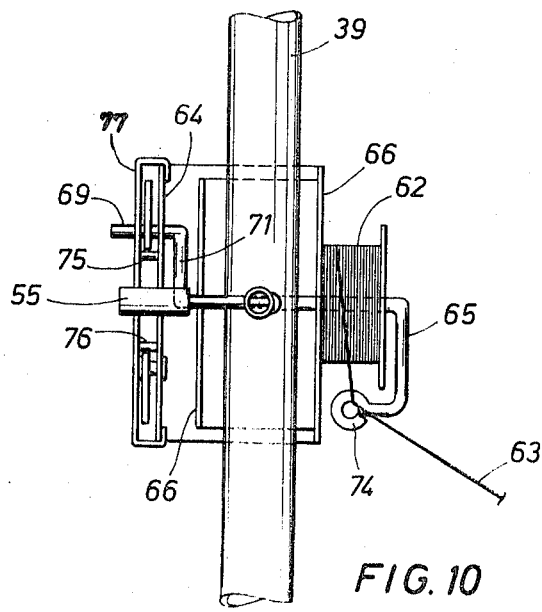
FIG. 10 is a detailed top plan view of the mechanism of FIGS. 7, 8 and 9 taken along line 10—10 of FIG. 7.
Figure 9:
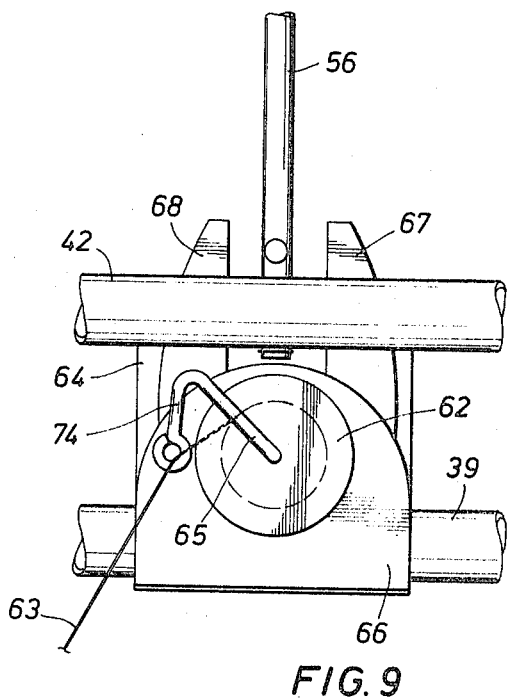
FIG. 9 is a front-end elevation view of the mechanism of FIGS. 7 and 8 taken along line 9—9 of FIG. 7.

Referring now particularly to FIG. 7, the means for actuating the tack changing mechanism of FIGS. 7 through 10 will be explained. As previously stated, the rotating shaft 56 mounted along the centerline of sail 40 comprises an arm member 55 which is so disposed that it lies between the upper ends of escapement arms 67, 68 (see FIG. 8). The wind vane 50 is mounted on a rod 51 which engages the hollow center of shaft 56 for rotation relative thereto. Stationarily affixed to the shaft 56 in a plane perpendicular to its axis is a lower plate member 96. Mounted on top of lower plate member 96 is an intermediate plate 91 and an upper plate 92. Intermediate plate 91 has an upturned lug 93 and upper plate 92 has an upturned lug 94. These lugs 93 and 94 may be angularly positioned relative to vane 50 by loosening a screw 95 and rotating their respective plates 91, 92 to the desired position. Screw 95 may then be tightened again so that all the plates 91, 92 and 96 will then rotate with shaft 56. As long as vane 50 lies somewhere between stop lugs 93 and 94, shaft 56 will not rotate. Since vane 50 is free to follow the wind, it will begin to rotate relative to lugs 93 and 94 as the sail 40 is placed in a tacking direction causing the raft to sail in an arc. Since the vane 50 remains with the wind and since the lugs 93, 94 move with the raft 30, the vane 50 approaches one of the lugs at the extreme ends of the arc. When the raft has moved to a certain point en the arc, the vane 50 then engages one of the stop lugs 93, 94 causing the shaft 56 to rotate in one direction. This in turn causes the arm 55 of shaft 56 to engage one of the escapement arms of the tack changing mechanism 60, releasing its crank and moving the point of force applied to line 63 to the opposite side of the raft centerline. The sail tack is changed and the raft sails in the opposite direction until the vane 50 contacts the other lug 93, 94 to automatically repeat the cycle.

Thus it can be seen that with the present invention a sail fishing device can be made to sail in an arc about the end of a guideline and to reverse directions of sail to sweep a broad area of water with baited hooks. Although two embodiments have been shown, the first a simplified hand operated version and the second a completely automatic version, many other variations of the present invention will be apparent to those skilled in the art. It is therefore intended that the scope of the invention be limited only by the claims which follow.

I claim:

1. Fishing apparatus comprising: a floating body; sail means mounted on said body substantially perpendicular and transverse to the longitudinal centerline of said body; control means attached to said body; and a line, one end of which is attached to said control menas, the opposite end of which is held at some point removed from said floating body, said control means being operable to alternately transfer the point, at which the force of wind blowing on said sail is transmitted to said line, from one side of said floating body centerline to the other.

2. Fishing apparatus as set forth in claim 1, characterized by a guide member near one end of said floating body through which said line passes to limit the tack position of said sail means.

3. Fishing apparatus as set forth in claim 1, characterized in that said control means comprises a pair of spring biased members, one on each side of said body centerline, about which said line is wound, one loop of said line being disengageable from one of said biased members on application of a slight jerk to said line to effect said point transfer.

4. Fishing apparatus as set forth in claim 3, characterized in that each of said biased members comprises a spring clip whose longitudinal axis is substantially parallel to said body centerline, said clip being stationarily affixed at one end to a plate member, the other end being biased into engagement with said plate member confining a plurality of loops of said line about said spring clip until said loops are consecutively disengaged therefrom by consecutive jerks applied to said line.

5. Fishing apparatus as set forth in claim 1, characterized in that said control means comprises a tack changing mechanism engageable by shaft means mounted on said floating body to effect said point transfer, said shaft means being rotatable to effect said transfer on contact with a wind vane mounted on said floating body.

6. Fishing apparatus as set forth in claim 5, characterized in that said control means comprises a fixed cylindrical reel whose axis is parallel to said body centerline, said tack changing mechanism comprising a rotating crank member having a shaft the axis of which is coincidental with said reel axis, one end of said shaft having an arm at the end of which is an eye member through which said line passes from a wound position on said reel, said eye being movable, on the response of said crank member to engagement with said shaft means, from a first position on one side of said body centerline through 180° angular displacement to a second position on the oppoSite side of said body centerline.

7. Fishing apparatus comprising: a floating body; sail means stationarily affixed on said floating body substantially perpendicular to the longitudinal centerline thereof; a line attached at one end to said floating body, the other end of which is held at a point removed from said floating body; and control means mounted on said body for changing the tack of said sail means by alternately transferring the point, at whIch the force of wind blowing on said sail means is transmitted to said line, from one side of said floating body centerline to the other.

8. Fishing apparatus as set forth in claim 7, characterized in that said control means comprises a fixed reel member about which said one end of said line is wound, said reel member being adapted to allow consecutive loops of said line to be removed from said reel for effecting said alternate transfer of said point.

9. Fishing apparatus as set forth in claim 8, characterized in that said control means comprises a crank member, having a shaft whose axis coincides with the axis of said reel member, and an arm member at one end of said shaft, having an eye member through which said line passes from said wound position on said reel member, said eye member being movable on rotation of said crank member from a first position on one side of said body centerline to a second position on the opposite side of said body centerline.

10. Fishing apparatus as set forth in claim 9, characterized in that said control means comprises cam means engaging said crank member at one end thereof operable to allow consecutive 180° rotation of said crank member.

11. Fishing apparatus as set forth in claim 10, characterized in that said control means comprises wind vane means connected, through connection means, with said cam means to activate said cam means on predetermined directions of wind relative to said body centerline.

12. Fishing apparatus as set forth in claim 11, characterized in that the connection between said wind vane means comprises a rotating shaft, which is mounted perpendicular to said body centerline and has an arm portion for engagement with said cam means, said wind vane being engageable with said shaft at predetermined angles relative to said body centerline to move said arm portion into engagement with said cam means for operation thereof.

13. Fishing apparatus comprising: a floating body; sail means mounted on said body; a line attached to said body for extension to a point removed therefrom; and control means mounted on said body for shifting the point, where force from said sail means is applied to said line, to change the tack of said sail means; said control means comprising a fixed reel member, about which said line is wound, a crank member mounted for rotation about an axis coincidental with the axis of said reel member, and an escapement mechanism; said crank member having a first arm portion at the end of which is an eye member through which said line passes from its wound position on said reel member; said escapement mechanism engaging said crank member at its opposite end to allow 180° rotation of said crank member on activation of said escapement mechanism.

14. Fishing apparatus as set forth in claim 13, characterized in that said escapement mechanism comprises a pair of arm members mounted for pivoting motion about axes parallel with said crank axis, each of said escapement arm members having a stop notch therein for engagement with a portion of said crank member, each of said escapement arm members being biased toward said engagement with said crank member portion but movable against said bias to release said crank for said 180° rotation.

* * * * *